Nov. 20, 1962  F. K. HIBY  3,064,498
VARIABLE SPEED GEARS

Filed May 31, 1960  4 Sheets-Sheet 1

—FIG. 1.—

INVENTOR
FRIEDRICH KARL HIBY
BY
Morris + Bateman
ATTORNEYS

Nov. 20, 1962  F. K. HIBY  3,064,498
VARIABLE SPEED GEARS
Filed May 31, 1960  4 Sheets-Sheet 2

—FIG. 2.—

INVENTOR
FRIEDRICH KARL HIBY
BY
Norris & Bateman
ATTORNEYS

Nov. 20, 1962  F. K. HIBY  3,064,498
VARIABLE SPEED GEARS

Filed May 31, 1960 4 Sheets-Sheet 4

INVENTOR
FRIEDRICH KARL HIBY
BY
Jonis & Bateman
ATTORNEYS

United States Patent Office 3,064,498
Patented Nov. 20, 1962

3,064,498
VARIABLE SPEED GEARS
Friedrich Karl Hiby, 69 Swann Lane,
Cheadle Hulme, England
Filed May 31, 1960, Ser. No. 32,921
3 Claims. (Cl. 74—796)

This invention relates to improvements in variable speed gears.

The object of the present invention is to incorporate pairs of hyperboloid drums to produce an infinitely variable speed reduction gear.

According to the invention the driving or input shaft imparts a drive to a plurality of hyperboloidical or conical surfaces given a rotary movement about their own axes, the drive being transmitted from the driving hyperboloidical or conical surfaces by balls to further inversely mounted driven hyperboloidical or conical surfaces connected to the driven or output shaft.

The invention will be described with reference to the accompanying drawings:

FIG. 6 is a detail view of the conrtol rod 63 and ball races 55, 57.

Figure 1:
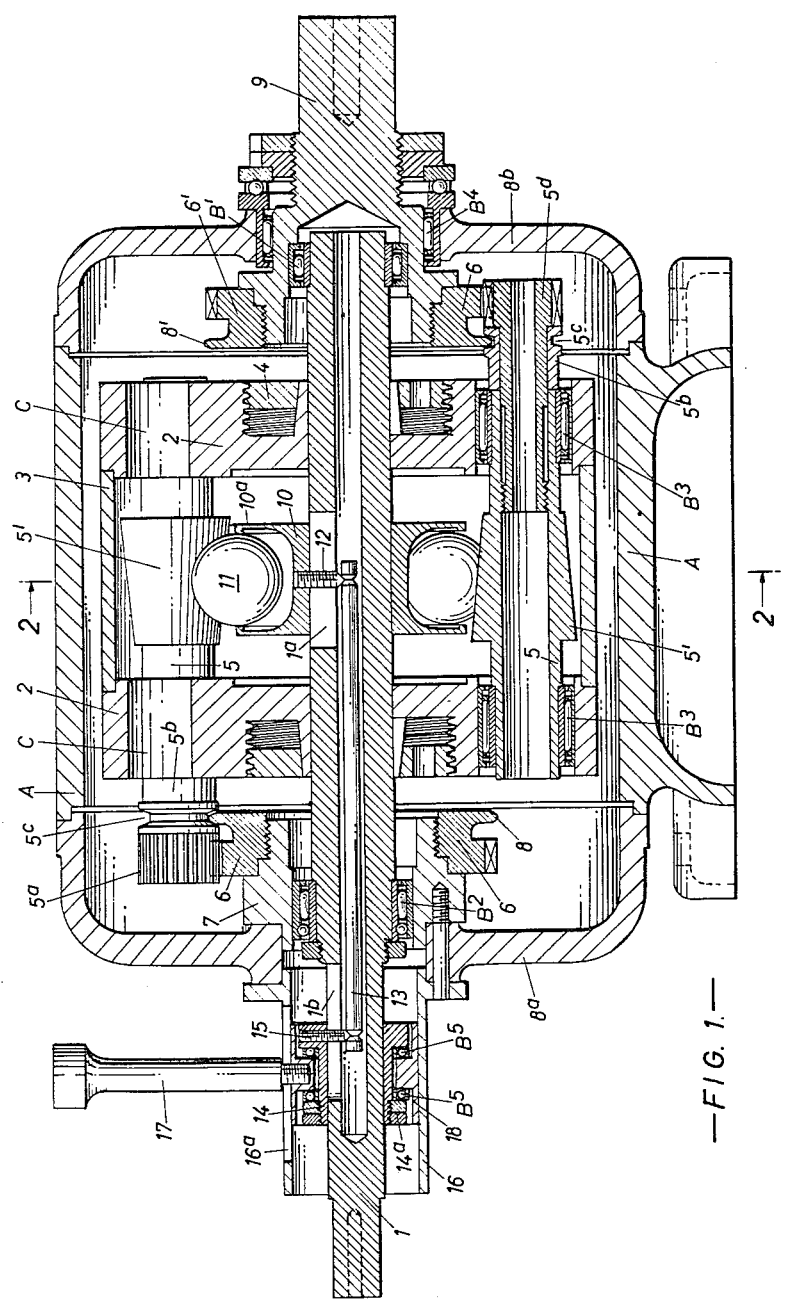
FIG. 1 is a longitudinal section on line 1—1, FIG. 2, of one drive, in accordance with the invention.

The variable speed gear is mounted in a casing A, an input or driving shaft 1 passing into one end of the casing and rotating therein in a needle bearing $B^1$ in one end of the casing and in a combined double thrust needle ball bearing $B^2$ in the opposite end which locates the shaft in the axial direction.

A pair of discs 2, spaced apart by a sleeve 3, are keyed on to the driving shaft 1 or may be affixed thereto by externally threaded rings 4 engaging tapered recesses in the discs 2 to lock the discs to the shaft.

A plurality of concentric holes or bores are formed in the discs 2 housing bearings $B^3$. Spindles 5 extend between the end discs 2 and are mounted in the bearings $B^3$. The spindles 5 are hollow and the central portion of each is formed with a conical or hyperboloidical portion $5^1$ and with a spur wheel $5a$ at one end mounted on an extension of the spindle on the outer side of the disc, the extension and spur wheels $5a$ being alternately at opposite ends of the spindles 5, those at the output end of the casing being indicated by $5d$. The spur wheels $5a$, $5d$ are located by rings $5b$ thereon.

The spur wheels $5a$ at the input end of the casing A engage the teeth on a sun wheel 6 rigidly mounted on a carrier 7 bolted to an end plate $8a$ of the casing A. A collar 8 on the sun wheel engages a groove $5c$ in the ring $5b$.

The alternate spur wheels $5d$ at the output end of the casing engage the teeth of a second sun wheel $6^1$, a collar thereon engaging the grooves $5c$ in the rings $5b$. The second sun wheel $6^1$ is mounted on the output shaft 9 which is mounted in line with the input shaft 1.

The inner end of the output shaft 9 is recessed to receive the end of the input shaft 1 and the bearing $B^1$ and is carried by an external bearing $B^4$ housed in the end $8b$ of the casing.

A ball cage 10 formed as a ring with end flanges $10a$ is slidably mounted on the input shaft 1 intermediate the discs 2. A plurality of balls 11, six being shown in the drawings, are arranged in a plane at right angles to the input shaft 1 between the flanges $10a$ of the cage 10, the clearance between the flanges being substantially equal to the diameter of the balls. Each ball 11 is mounted to engage the conical or hyperboloidical portions of two adjacent spindles 5, the surfaces of these portions preventing the ball from escaping from the cage. Grub screws 12 extend from the cage 10 into slots $1a$ in the shaft 1 to cause the cage to rotate therewith and passing into the hollow interior thereof. The grub screws 12 engage a groove in a rod 13 passing through the interior of the shaft 1.

A sleeve 14 is mounted as a sliding fit on the input shaft outside the casing A and is connected to the rod 13 by grub screws 15 passing through slots $1b$ in the shaft 1 and engaging a further groove in the rod.

A tube 16 is mounted on the end plate $8a$ provided with a longitudinal slot $16a$ through which is passed one end of a control lever 17 secured to a bush 18 capable of sliding in the tube 16. The sleeve 14 has a flange at one end and is screwed to receive nuts $14a$ to form a groove to house the bush 18, ball races $B^5$ being provided to take the side thrust between the rotary sleeve 14 and the bush 18.

When the input shaft 1 is rotated the discs 2, cage 10 and sleeve 14 rotate with the shaft and the spur wheels $5a$ at the input end of the casing rotate their spindles 5 about their axes through the stationary sun wheel 6. The balls 11 are thrown outwards by centrifugal force into contact with two adjacent spindles 5, one of which is rotating about its own axis and accordingly a rotational movement is given to the balls about their centres. The balls accordingly transmit a rotary movement to the alternate spindles 5, the spur wheels $5d$ on which engage the sun wheel $6^1$ which is given a rotary movement about its axis. The sun wheel $6^1$ is mounted on the driven shaft 9 which is thereby rotated.

Since each ball 11 is in contact with the hyperboloidical or conical portions $5^1$ on a driving and a driven spindle 5, and since the portion $5^1$ on the driving spindle tapers the speed of rotation of the balls about their own axis can be varied by movement of the cage 10 to bring the balls 11 into contact with the portion $5^1$ at any desired diameter thereof.

Further as the conical portion $5^1$ of the driven spindle tapers in the opposite direction to that of the driving portion $5^1$ the direction and speed of rotation of the driven shaft can be varied. When the balls are in contact with conical portions $5^1$ of equal diameter on both the driving and driven spindles 5 as shown in FIG. 1 the spur wheels $5d$ will run round the sun wheel $6^1$ without imparting any rotational movement thereto. However, as the cage is moved longitudinally by the rod 13 in one direction from this neutral position the difference in speed between the driving and driven spindles will cause the sun wheel $6^1$ and driven shaft to rotate. If the cage is moved in the opposite direction the sun wheel $6^1$ and driven shaft will be rotated in the reverse direction, the speeds of rotation varying with the position of the balls on the conical portions.

In other words the speed of rotation of the driven spindles 5 relatively to that of the driving spindles depends on the diameter of the conical portions $5^1$ engaged by the balls, their direction of rotation being always the same. When the balls are orbiting in a perpendicular plane on portions $5^1$ of equal diameter, the driven spindles rotate at the same speed as the driving spindles and their planet spur wheels will orbit the driven spur wheel without imparting rotation thereto.

When the bush 18 is moved in one direction by the lever 17 the movement is transmitted to the ball cage 10 through the rod 13 and the position of the balls on the conical portions $5^1$ is varied thereby transmitting a rotary movement to the spur wheel $6^1$ and the driven shaft 9.

When the surfaces of the cones $5^1$ are shaped hyperboloidically the balls will roll along the surfaces at a constant perpendicular distance from the central axis of rotation and the balls do not exert any pressure on the ball cage 10 which holds them loosely in their plane of orbit.

The normal pressure exerted by the balls on the inclined hyperboloidical surfaces has a component force in the axial direction of the spindles 5. This thrust is transmitted to the locating collars 8, $8^1$ of the sun wheels and is taken by the bearing $B^4$.

Lightening holes C may be provided in the discs 2.

In the construction shown in FIGS. 3, 4, 5 and 6 the gear casing $A^1$ is formed of two cylindrical sections bolted together through flanges a thereon. The flanges are also bolted to a flange (not shown) on a power unit such as an electric motor or turbine thus forming a flange mounted unit.

The outer races 21, 22 of two roller bearings 23, 24 are carried in the bases of the flanges a separated by a spacing ring 25.

The power unit drives the gear by rotating the input shaft 26 upon which is rigidly mounted a co-axial disc 27 carrying one end of a slotted spacing tube 28, the other end of which is secured to a disc 29. The shaft 26 and discs 27, 29 rotate in bearings 30.

A plurality of studs 31 project inwardly from both discs 27, 29 to receive bearings 32 between pairs of which are arranged tubes 33. Alternate tubes 33 carry two conical or hyperboloidical surfaced tubes 34, 35 mounted between end stops 36 on the tube 33 and a central spacing member 37. Further tubes 38 alternate with the tubes 33 and are similarly mounted to carry two conical or hyperboloidical surfaced tubes 39, 40, mounted between end stops 41 on the tube 38 and a central spacing member 42 incorporating a roller 42 engaging a track 44 on the inside of the bearing 24.

The spacing member 37 incorporates a roller 45 engaging a track 46 on the inside of the bearing 23. The track 46 is affixed to and carried on a cylindrical shell 47 which also supports one of the bearings 30, and is maintained concentric with the shaft 26 by bearings 48 carried in an end plate 49.

A similar cylindrical shell 50 is rigidly connected to the inner race 44 of the bearing 24 and supports the second bearing 30 being maintained concentric with the shaft 26 by bearings 51 carried in an end plate 52.

The shell 47 extends outwards through the end plate 49 of the casing A around the shaft 26 and may be held from rotation by a suitable device applied to the keyway and the track 46 is thus also held stationary.

Two ball cages 53, 54 are mounted to be capable of sliding longitudinally on the spacing tube 28. The ball cage 53 being secured to the outer race of a bearing 55 mounted within the tube 28 by studs 56 and the ball cage 54 is secured to the outer race of a similar bearing 57 by studs 58. The outer races of the bearings 55, 57 and the cages 53, 54 rotate with the tube 28 and slots 59 in the tube 28 allow for their longitudinal movement.

When the discs 27, 29 are circling the central axis of rotation with the input shaft 26 the alternate spacing members 37 which are in contact with the stationary track 46 are caused to rotate about their own axes.

The ball cage 53 carries balls 60 which engage two adjacent conical surfaces 39, 34. Similarly the ball cage 54 carries balls 61 which engage the conical surfaces 40, 35.

A slotted operating tube 62 for the cages 53, 54 is mounted inside the spacing tube 28 upon which the inner races of the bearings 55, 57 slide in a slot 62a therein. The portions of the races 55, 57 passing through the slots 62 engage respectively with a right hand and a left hand thread on a control rod 63, rotation of which in one direction brings the cages closer together and rotation in the opposite direction separates them.

The operating tube 62 is rigidly held at one end by an end plate 64 of the casing A and prevents the inner races of the bearings 55, 57 from rotating. Rotation of the control rod 63 by a lever applied to its free end which extends through the end plate 64 causes the cages 53, 54 to move inwards or to separate.

A ring 67 is mounted on the rod 63 between the end plate 64 and a cover plate 65 by a grub screw 66 and holds the rod 63 in the position where the planes of orbits for the balls 60, 61 are at equal distances from the centre line of the gear.

Figure 2:
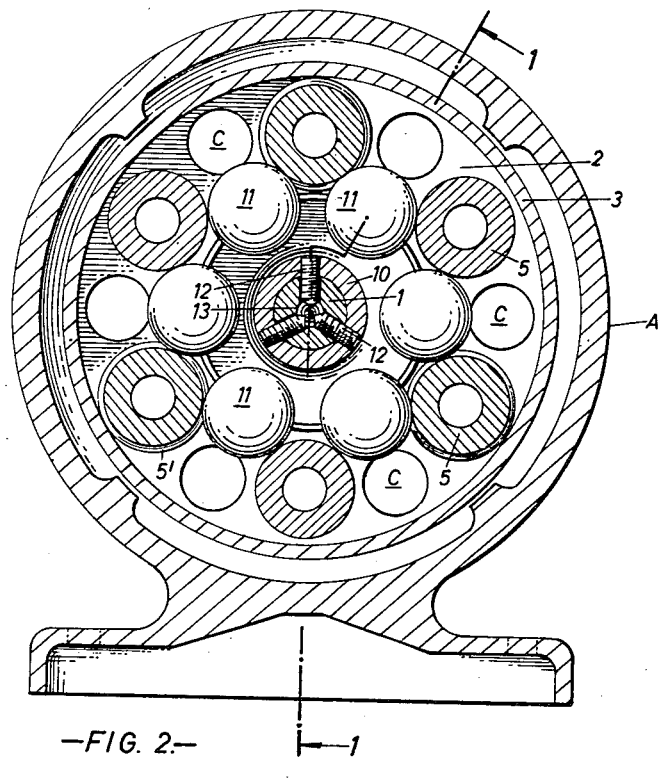
FIG. 2 is a section on line 2—2, FIG. 1.

The balls 60, 61 transmit the drive as described with reference to FIGS. 1 and 2 at a speed ratio relative to their position on the conical surfaces. The output cylinder 50 is thus driven by the balls and is formed with a tubular extension which rotates at a speed dependent on the position of the balls.

The neutral position of the gear occurs where the balls contact diameters on the driving input cones and on the driven output cones having the ratio $$\frac{\text{track diameter } 44 \times \text{roller diameter } 45}{\text{track diameter } 46 \times \text{roller diameter } 43}$$

Figure 3:
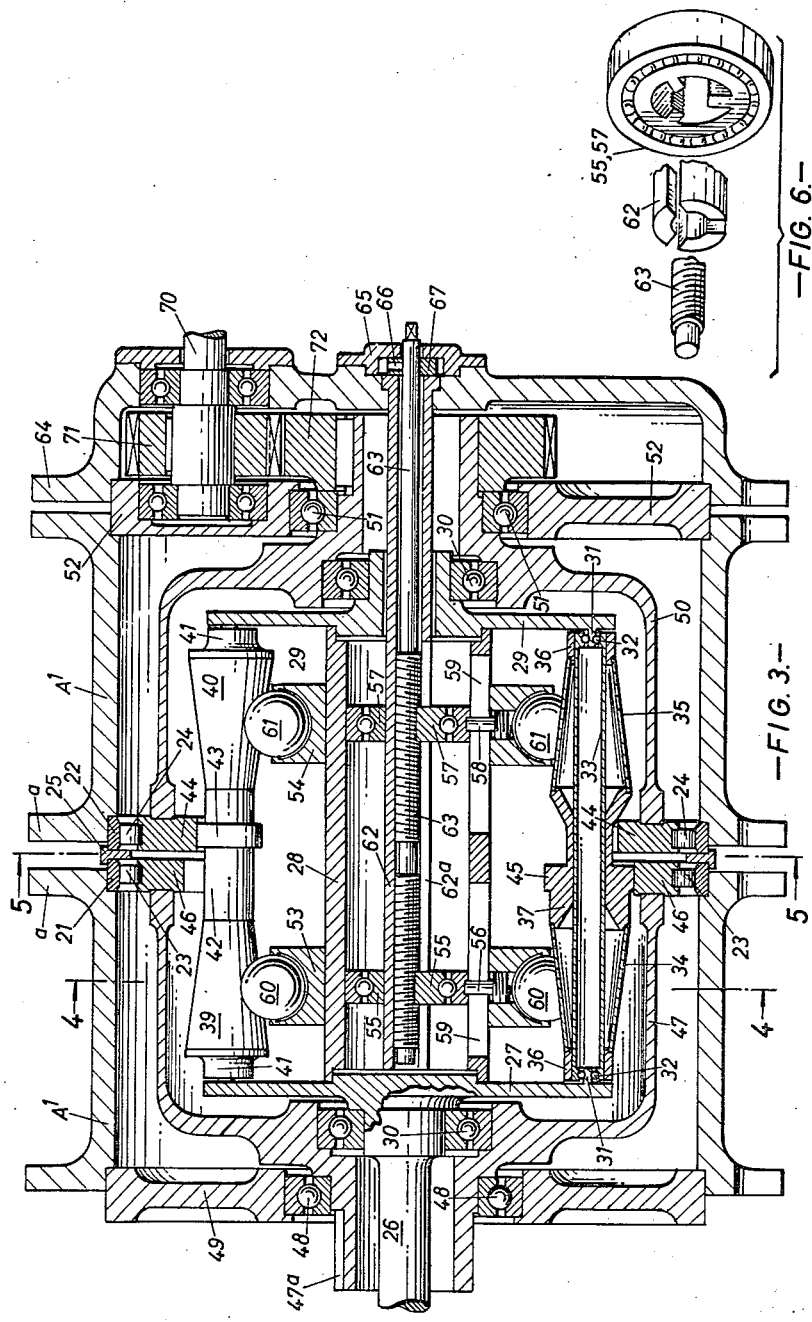
FIG. 3 is a longitudinal section of a further arrangement.
Figure 4:
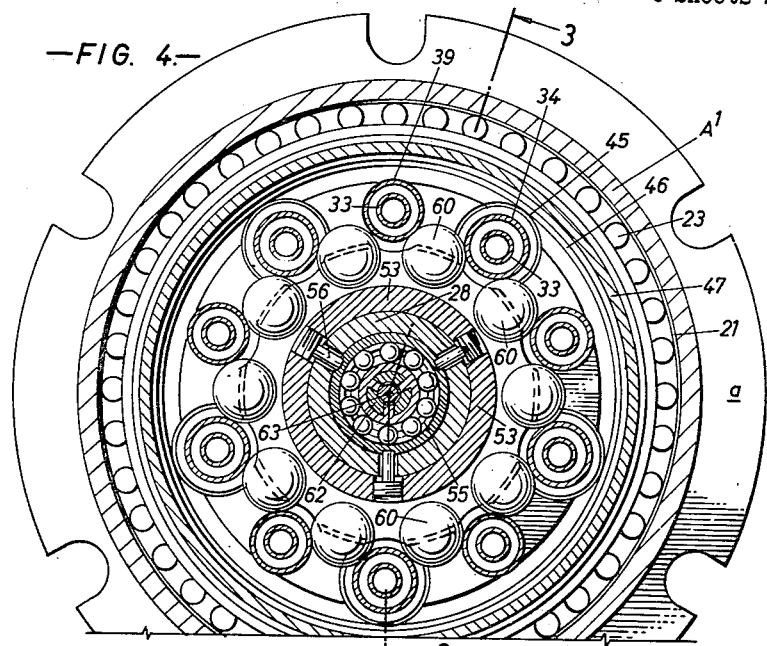
FIG. 4 is a section on line 4—4, FIG. 3, partly broken away.
Figure 5:
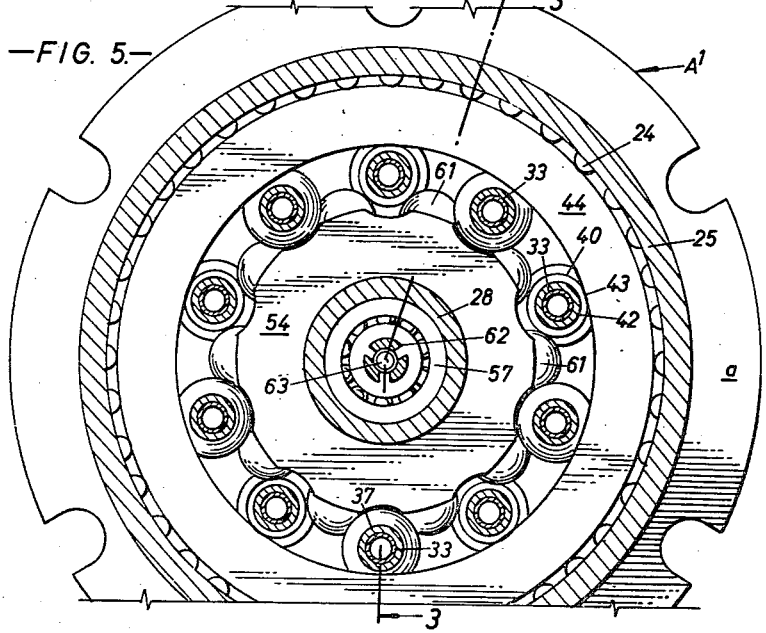
FIG. 5 is a section on line 5—5, FIG. 3, partly broken away.

In the actual positions of the balls shown in FIG. 3 the output shaft is driven in the direction of the input shaft, the speed of the output shaft being progressively increased by moving the cages further apart.

The output may be taken from a shaft 70 carrying a pinion 71 engaging a pinion 72 mounted on the end of the output cylinder 50. The direction of rotation of the output shaft is thus reversed by the gearing and the speed may also be raised thereby.

The shell 47 may be geared to the input shaft and driven at reduced speed to supply a secondary input.

I claim:

1. A variable speed gear comprising a casing mounting an input shaft and an output shaft, a plurality of pairs of spindles arranged concentrically around the input shaft, means drive connecting one spindle of each pair to the input shaft, means providing inversely directed conical surfaces on the spindles, a sun wheel, driving means on one spindle of each pair engaging the sun wheel, balls in contact with the inversely directed conical surfaces of each pair of spindles through which the drive is transmitted to the other spindle of each pair, driving means mounted on the other spindle of each pair driving the output shaft and means for varying the position of the balls relatively to the inversely directed conical surfaces.

2. A variable speed gear comprising a casing mounting an input shaft and an output shaft, a plurality of pairs of spindles arranged concentrically around the input shaft, means drive connecting one spindle of each pair to the input shaft, means providing inversely directed conical surfaces on the spindles, a sun wheel, driving means on one spindle of each pair engaging the sun wheel, a cage mounted for longitudinal movement on the input shaft, balls carried in the cage in contact with the inversely directed conical surfaces of each pair of spindles through which the drive is transmitted to the other spindle of each pair, driving means mounted on the other spindle of each pair driving the output shaft and means for varying the position of the balls relatively to the inversely directed conical surfaces.

3. A variable speed gear comprising a casing mounting an input shaft and an output shaft, a plurality of pairs of spindles arranged concentrically around the input shaft, means drive connecting one spindle of each pair to the input shaft, means providing inversely directed conical surfaces on the spindles, a sun wheel, driving means on one spindle of each pair engaging the sun wheel, a cage mounted for longitudinal movement on the input shaft, balls carried in the cage in contact with the inversely directed conical surfaces of each pair of spindles through which the drive is transmitted to the other spindle of each pair, driving means mounted on the other spindle of each pair driving the output shaft and a rod for varying the position of the cage relatively to the conical surfaces and a hand lever for controlling the rod.

References Cited in the file of this patent

UNITED STATES PATENTS

| | | |
|---|---|---|
| 2,555,119 | Elliott | May 29, 1951 |
| 2,560,816 | Petersen | July 17, 1951 |
| 2,868,038 | Billeter | Jan. 13, 1959 |
| 2,878,692 | Wolf | Mar. 24, 1959 |